United States Patent
Yonezawa et al.

(10) Patent No.: US 6,458,891 B1
(45) Date of Patent: Oct. 1, 2002

(54) HYDROGENATED BLOCK COPOLYMER

(75) Inventors: Jun Yonezawa; Eiji Sasaya, both of Yokohama (JP)

(73) Assignee: Asahi Kasei Kabushiki Kaisha, Tokyo (JP)

(*) Notice: Subject to any disclaimer, the term of this patent is extended or adjusted under 35 U.S.C. 154(b) by 0 days.

(21) Appl. No.: 09/554,314

(22) PCT Filed: Sep. 13, 1999

(86) PCT No.: PCT/JP99/04987

§ 371 (c)(1), (2), (4) Date: May 12, 2000

(87) PCT Pub. No.: WO00/15680

PCT Pub. Date: Mar. 23, 2000

(30) Foreign Application Priority Data

Sep. 14, 1998 (JP) .............................. 10-259666

(51) Int. Cl.[7] ................. C08F 297/04; C08L 53/02; C08L 23/10
(52) U.S. Cl. ............... 525/88; 525/92 D; 525/98; 525/314; 525/316; 526/79
(58) Field of Search ............... 526/79; 525/98, 525/314, 92 D, 316, 88

(56) References Cited

U.S. PATENT DOCUMENTS

| | | |
|---|---|---|
| 4,386,125 A | 5/1983 | Shiraki et al. |
| 5,189,110 A | 2/1993 | Ikematu et al. |
| 5,278,232 A | 1/1994 | Seelert et al. |
| 5,358,986 A | 10/1994 | Onofusa et al. |
| 6,239,218 B1 | 5/2001 | Yonezawa et al. |

FOREIGN PATENT DOCUMENTS

| | | |
|---|---|---|
| DE | 198 15 895 A | 10/1998 |
| EP | A173380 | 3/1986 |
| EP | 0 263 678 A | 4/1988 |
| EP | 733 675 A1 | 9/1996 |
| EP | 0 884 359 A1 | 12/1998 |
| JP | 61-155446 * | 7/1986 |
| JP | 61 155446 A | 7/1986 |
| JP | A912804 | 1/1997 |
| JP | 09 012804 A | 1/1997 |
| JP | 09 145238 | 6/1997 |
| WO | 96/07681 | 3/1996 |

OTHER PUBLICATIONS

Hayano et al., CAPLUS abstract of JP61–155446 (Jul. 7,1986).*

* cited by examiner

*Primary Examiner*—Jeffrey Mullis
(74) *Attorney, Agent, or Firm*—Birch Stewart Kolasch & Birch LLP

(57) ABSTRACT

A hydrogenated block copolymer has at least two polymer blocks A each having an aromatic vinyl hydrocarbon compound monomer unit and at least two hydrogenated polymer blocks B each having a hydrogenated butadiene monomer unit. At least 90% of olefinically unsaturated double bonds in the polymer blocks mainly having a butadiene monomer unit before hydrogenation have been hydrogenated. At least one of the locks at the terminal of the hydrogenated block copolymer is the polymer block B. The proportion of the terminal polymer blocks B in the hydrogenated block copolymer is 0.1 wt % to 9.1 wt %. The proportion of the aromatic vinyl hydrocarbon compound in the hydrogenated block copolymer is 25 wt % to 80 wt %. The 1,2-bond content of the polymer blocks having a butadiene monomer unit before hydrogenation averages 60 mol % to 99 mol %. The resulting resin composition improves the balance among the appearance of its molded article, tensile elongation at break and moldability.

16 Claims, 1 Drawing Sheet

HYDROGENATED BLOCK COPOLYMER

This application is the national phase under 35 U.S.C. §371 of PCT International Application No. PCT/JP99/04987 which has an International filing date of Sep. 13, 1999, which designated the United States of America.

FIELD OF THE INVENTION

The present invention relates to a hydrogenated block copolymer having a specific structure; and to a resin composition which comprises an alloy of a polypropylene resin with a polyphenylene ether or polystyrene resin and the hydrogenated block copolymer having a specific structure, which composition is improved in the balance among appearance of the molded article; tensile elongation at break and moldability by the incorporation of the hydrogenated block copolymer, and which composition has characteristics of both the polypropylene resin and the polyphenylene ether resin or polystyrene resin in combination.

BACKGROUND OF THE INVENTION

Polypropylene resins have been used in various fields as a molded article owing to their excellent organic solvent resistance and chemical resistance, however, they are accompanied with the drawbacks such as low rigidity and low heat resistance. Polyphenylene ether resins, on the other hand, are accompanied with such a problem as inferior organic solvent resistance in spite of having excellent rigidity and heat resistance. Polystyrene resins are inexpensive and excellent in moldability and rigidity, but inferior in organic solvent resistance. A mixture of these resins has been proposed as a resin composition having merits of each of the resins in combination. A polypropylene resin has only poor compatibility with each of a polyphenylene ether resin and a polystyrene resin so that systems further comprising a compatibilizing agent are proposed (JP-A-53-71158, JP-A-5-88960 or JP-A-59-100159 (The term "JP-A" as used herein means an "unexamined published Japanese patent application")). These systems are however accompanied with the problems that morphology tends to undergo a change upon heat retention or at the time when a solidifying rate is not uniform in a mold and flow marks appear depending on a change in the molding conditions or depending on the place of the molded article, which makes them unsuitable for practical use. In addition, the resin composition has recently been required to have high tensile elongation at break, among various mechanical properties such as rigidity and impact resistance, to prevent the molded article from being broken, when exposed to stress. As a compatibilizing agent exhibiting morphology stability, a diblock copolymer having segments compatible respectively with the resins to be blended are most effective. It is also known that the use of such a diblock copolymer, however, prevents exhibition of high tensile elongation at break, because the strength on the interface between the two resins becomes low. Thus, the external appearance of the molded article, which varies depending on the morphology stability upon thermal retention, and tensile elongation at break are physical properties which have been unable to be satisfied so far simultaneously. For the improvement of morphology stability upon heat retention, it is preferred that the segments of the block copolymer, which is added as a compatibilizing agent, compatible with the resins respectively each has a higher molecular weight. An increase in the molecular weight of the segment to impart it with a sufficient molecular weight lowers fluidity, leading to a deterioration in the moldability or prevents the exhibition of desired physical properties owing to poor dispersion.

The addition of a hydrogenated block copolymer as a compatibilizing agent is proposed, for example, in JP-A-63-225642. This publication discloses a resin composition comprising a polypropylene resin, a polyphenylene ether resin and a hydrogenated block copolymer, and examples using a styrene-hydrogenated butadiene diblock copolymer and a styrene-hydrogenated butadiene-styrene triblock copolymer as the hydrogenated block copolymer have been effected therein. Diblock, triblock and tetrablock structures are exemplified as preferred structures of the hydrogenated block copolymer. Concerning the tetrablock structure, however, neither description on the amount of the terminal hydrogenated butadiene block, which is specified particularly in the invention of the present application, nor suggestion about its effects is included in the above-described disclosure. Examples using the tetrablock structure are not also included therein. The external appearance of the molded article which depends on the morphology stability upon thermal retention and tensile elongation at break, which are problems to be solved by the present invention, are not satisfactory in accordance with the above-described conventional technique.

JP-A-9-12804 discloses a resin composition comprising a polypropylene resin, a polyphenylene ether resin and a hydrogenated block copolymer. Examples of a styrene-hydrogenated butadiene-styrene-hydrogenated butadiene block copolymer and a hydrogenated butadiene-styrene-hydrogenated butadiene-styrene-hydrogenated butadiene block copolymer used as the hydrogenated block copolymer have been effected therein. Although this publication includes a description that the composition is excellent in heat resistance, rigidity and tenacity (particularly, elongation), the moldability and external appearance of the molded article are not satisfactory. Moreover, it includes neither a description on the amount of the terminal hydrogenated butadiene block nor a suggestion about its effects.

JP-A-9-145238 discloses, as an inner wall material for refrigerator, a resin composition comprising a polypropylene resin, a polystyrene resin and a hydrogenated block copolymer. This publication includes neither a description of the amount of the terminal hydrogenated butadiene block in the hydrogenated block copolymer nor a suggestion about its effects. Moreover, it does not include examples effecting the same. According to this technique, external appearance of the molded article which depends on the morphology stability upon heat retention and tensile elongation at break, which are problems to be solved by the present invention, are not satisfactory.

An object of the present invention is to provide a resin composition excellent in rigidity, heat resistance and organic solvent resistance and also well-balanced among the appearance of the molded article, tensile elongation at break and moldability; and a hydrogenated block copolymer for obtaining the composition.

BRIEF SUMMARY OF THE INVENTION

With a view to attaining the above-described objects, the present inventors have carried out an extensive investigation. As a result, it has been found that a resin composition comprising a hydrogenated block copolymer having a specific structure, a polypropylene resin, and a polyphenylene ether resin or polystyrene resin effectively attains the above-described objects, leading to the completion of the present invention.

The above-described objects of the present invention have been achieved by the following hydrogenated block copolymers and resin compositions.

A hydrogenated block copolymer which comprises at least two polymer blocks A each mainly comprising an aromatic vinyl hydrocarbon compound monomer unit and at least two hydrogenated polymer blocks B each mainly comprising a hydrogenated butadiene monomer unit, at least 90% of olefinically unsaturated double bonds in the polymer blocks mainly comprising a butadiene monomer unit before hydrogenation having been hydrogenated, wherein at least one of the block at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer is at least 25 wt % but less than 80 wt %, and wherein the 1,2-bond content of the polymer blocks mainly comprising a butadiene monomer unit before hydrogenation is, on average, at least 60 mol % but less than 99 mol %.

2. The hydrogenated block copolymer according to the above embodiment 1, wherein the proportion of the aromatic vinyl hydrocarbon compound in the hydrogenated block copolymer is at least 25 wt % but less than 70 wt %.

3. The hydrogenated block copolymer according to the above embodiment 1, having a domain degradation temperature (Tdd) of 150° C. or higher.

4. The hydrogenated block copolymer according to the above embodiment 1, wherein the proportion of the terminal polymer blocks B in the hydrogenated block copolymer exceeds 0.5 wt % but less than 5.0 wt %.

5. A resin composition comprising the following components (1), (2a) and (3):

(1) 20 to 80 parts by weight of a polypropylene resin, (2a) 20 to 80 parts by weight of a polyphenylene ether resin, and (3) 1 to 40 parts by weight of the hydrogenated block copolymer according to any one of the above embodiments 1 to 4.

6. A resin composition comprising the following components (1), (2b) and (3):

(1) 20 to 80 parts by weight of a polypropylene resin, (2b) 20 to 80 parts by weight of a polystyrene resin, and (3) 1 to 40 parts by weight of the hydrogenated block copolymer according to any one of the above embodiments 1 to 4.

DETAILED DESCRIPTION OF THE INVENTION

Figure 1:
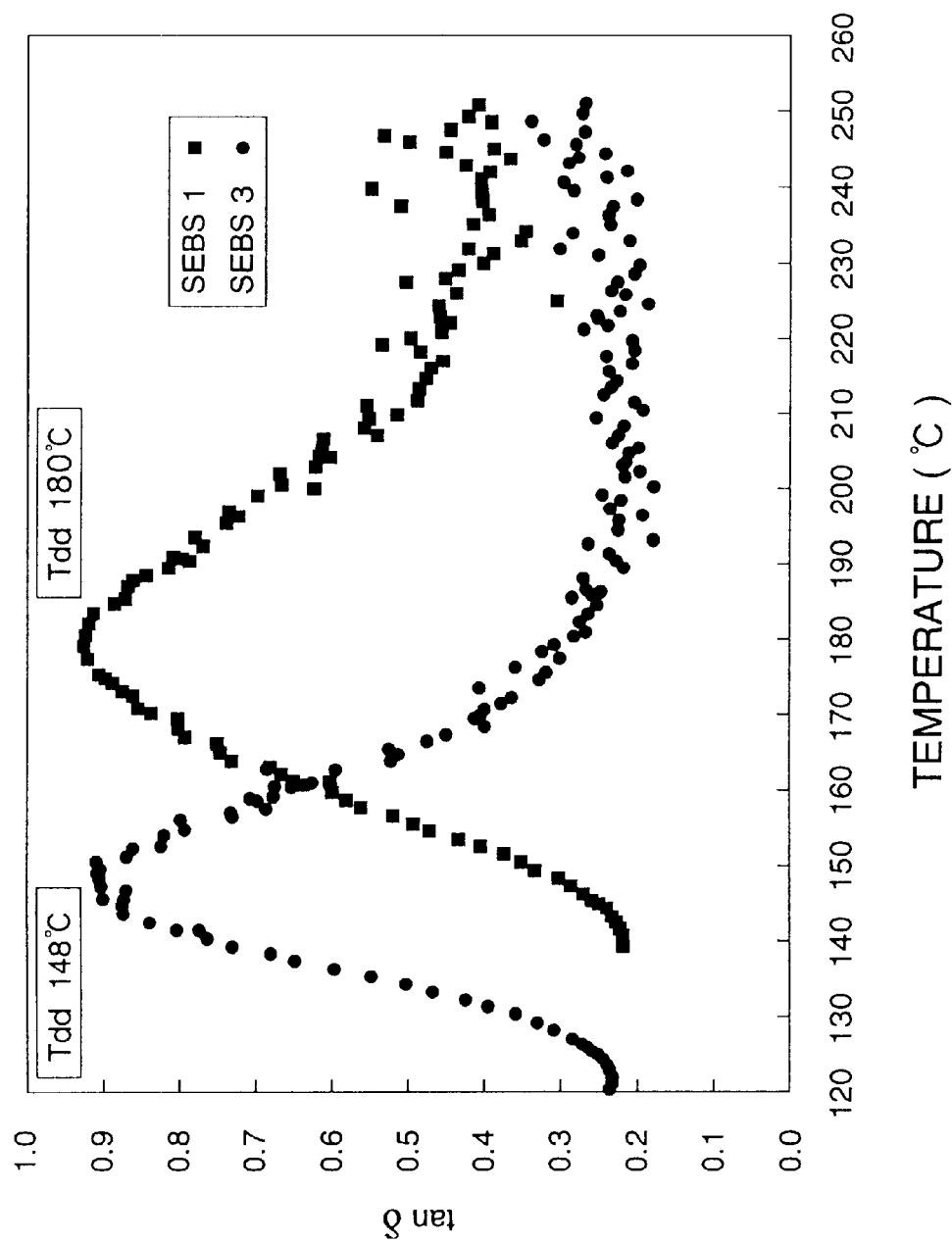
FIG. 1 illustrates Tdd of each of SEBS1 and SEBS2.

The present invention will hereinafter be described more specifically. The present invention is made based on the findings that in a composition formed of a polypropylene resin, a polyphenylene ether resin or polystyrene resin, and a hydrogenated block copolymer, when the content of the aromatic vinyl compound monomer unit in the hydrogenated block copolymer and the 1,2-bond content in the polymer blocks mainly comprising butadiene monomer units before hydrogenation each falls within a predetermined range, and at the same time, the block structure satisfies a specific structure, a resin composition excellent in heat resistance, rigidity and organic solvent resistance and also well-balanced among the appearance of the molded article, tensile elongation at break, and moldability can be obtained.

As the polypropylene resin (1) usable in the present invention, any resin available by homopolymerization of propylene or polymerization of propylene with at least one monomer selected from ethylene and $C_{4-12}$ α-olefins, for example, 1-butene, isobutylene and 4-methyl-1-pentene can be used. Among them, a homopolymer of propylene, propylene block copolymers and propylene random copolymers and mixtures thereof are preferred. The polymer different in the molecular weight or composition can also be mixed. As a comonomer of the block or random copolymer with propylene, α-olefins other than propylene or ethylene can be employed, of which the ethylene is preferred. The propylene content in such a copolymer is preferably at least 55 mol %. In the propylene block copolymer obtained using an α-olefin as a comonomer, an ethylene/α-olefin block forms a disperse phase with a homopropylene block as a continuous phase. The content of the disperse phase component is preferably 5 to 30 wt % of the propylene block copolymer. This disperse phase may contain polyethylene. The polypropylene resin can be obtained by any known polymerization method and examples include transition polymerization, radical polymerization and ion polymerization.

Examples of the polyphenylene ether resin (2a) usable in the present invention include poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dipropenyl-4,4-phenylene)ether, poly(2,6-dilauryl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-4-phenylene)ether, poly(2,6-dibenzyl-1,4-phenylene)ether, poly(2-ethoxy-1,4-phenylene)ether, poly(2-chloro-1,4-phenylene)ether and poly(2,5-dibromo-1,4-phenylene)ether, and similar resins thereof. In addition, a copolymer of 2,6-dimethylphenol and 2,3,6-trimethylphenol, a copolymer of 2,6-dimethylphenol and 2,3,5,6-tetramethylphenol and a copolymer of 2,6-diethylphenol and 2,3,6-trimethylphenol can be mentioned as examples. Moreover, the polyphenylene ethers usable in the present invention include modified ones such as those obtained by grafting a styrene or styrene monomer such as p-methylstyrene or α-methylstyrene on polyphenylene ether. The above-exemplified polyphenylene ethers can be prepared in a known process, for example, that described in the specification of U.S. Pat. No. 3,306,874, 3,306,875, 3,257,357 or 3,257,358, JP-B-52-17880 (the term "JP-B" as used herein means an "examined published Japanese patent publication") or JP-A-50-51197. Preferred examples of the polyphenylene ether include those having alkyl substituents at two ortho positions relative to the oxygen atom of ether, copolymers of a 2,6-dialkylphenol and copolymers of a 2,3,6-trialkylphenol, of which the copolymer of 2,6-dimethylphenol is preferred. The molecular weight of the polyphenylene ether preferably ranges from 0.2 dl/g to 0.7 dl/g in terms of reduced viscosity as measured in a chloroform solution at 30° C. Reduced viscosities less than 0.2 dl/g deteriorate the mechanical strength of the composition, while those exceeding 0.7 dl/g lower the moldability. The polyphenylene ether resin in an amount less than 50 wt % can be replaced with a polystyrene resin.

Examples of the polystyrene resin (2b) include polymers containing at least 50 wt % of styrene such as polystyrene, high-impact polystyrene, acrylonitrile-styrene copolymer, ABS resin, and styrene-methyl methacrylate copolymer, and mixtures thereof. The polystyrene resin in an amount less than 50 wt % can be replaced with a polyphenylene ether resin.

The hydrogenated block copolymer (3) usable in the present invention comprises at least two polymer blocks mainly comprising an aromatic vinyl hydrocarbon compound unit and at least two hydrogenated polymer blocks B mainly comprising a butadiene monomer unit. As the aromatic vinyl compound monomer unit, at least one monomer unit is selected from styrene, alkyl styrenes such as α-methylstyrene, p-methylstyrene and p-tertiary butyl styrene, paramethoxy styrene and vinyl naphthalene, of which the styrene is preferred. The content of the aromatic vinyl compound monomer unit in the block copolymer is at least 25 wt % but less than 80 wt, of which the content of at least 25 wt % but less than 70 wt % is preferred, the content exceeding 45 wt % but less than 60 wt % is more preferred and the content exceeding 45 wt % but less than 50 wt % being particularly preferred. Contents less than 25 wt % deteriorate the balance between heat resistance and tensile elongation at break, while those of 80 wt % or greater deteriorate the balance among appearance of the molded article, moldability, and impact resistance. The content-of the aromatic vinyl compound monomer unit can be measured by a nuclear magnetic resonance (NMR) apparatus or ultraviolet spectrophotometer (UV). In the present invention, the terms "mainly comprising", for example, in the case of "mainly comprising an aromatic vinyl compound monomer unit", means to include the case where the block comprises one or more aromatic vinyl monomers and also include the case where the aromatic vinyl monomer has been copolymerized with another monomer copolymerizable therewith by living anionic polymerization. Examples of the another monomer copolymerizable with the aromatic vinyl monomer(s) include conjugated diene compound monomers, methacrylates such as methyl methacrylate and butyl methacrylate, cyclohexadiene and caprolactone. They may be copolymerized in any form such as random, alternate and tapered. A plurality of polymer blocks A may differ in composition or molecular weight from one another.

In the present invention, the 1,2-bond content of the polymer block mainly comprising a butadiene monomer unit before hydrogenation is, on average, at least 60 mol % but less than 99 mol %, with the content of at least 62 mol % but less than 99 mol % being preferred and that of at least 70 mol % but less than 99 mol % being more preferred. Contents less than 60 mol % deteriorate the balance among tensile elongation at break, appearance of the molded article and moldability. The micro structure can be measured by a nuclear magnetic resonance (NMR) apparatus. The term "mainly comprising a butadiene monomer unit" means to include the case where butadiene has been copolymerized with another monomer copolymerizable therewith by living anionic polymerization. Examples of the another monomer copolymerizable with butadiene includes conjugated dienes such as isoprene, aromatic vinyl compound monomers, methacrylates such as methyl methacrylate and butyl methacrylate, cyclohexadiene and caprolactone. They may be copolymerized in any form such as random, alternate and tapered. A plurality of polymer blocks B may differ in composition or molecular weight from one another.

The terms "mainly comprising" as used herein mean that the corresponding monomer unit is contained in the polymer block in an amount of at least 50 mol %, preferably, at least 70 mol %.

The hydrogenated block copolymer of the present invention is obtained by hydrogenation of at least 90% of the olefinically unsaturated double bonds in the unhydrogenated polymer block B. Hydrogenation ratios less than 90% cause a deterioration by heat or light, leading to lowering in the thermoplasticity. The unsaturated double bonds of the benzene ring of the aromatic vinyl compound in the block A may be hydrogenated in an amount up to 20% based on the whole aromatic vinyl compound. These hydrogenation ratios can be measured by a nuclear magnetic resonance (NMR) apparatus.

The melt flow rate (MFR) of the hydrogenated block copolymer determined in accordance with JIS K 7210 under the conditions of a temperature of 230° C. and a load of 5 Kg preferably falls within a range of at least 0.02 g/10 min but less than 300 g/10 min, with a range of at least 0.03 g/10 min but not greater than 200 g/10 min being more preferred and a range of at least 0.2 g/10 min but not greater than 160 g/10 min being particularly preferred. Melt flow rates less than 0.2 g/10 min deteriorate the moldability of the composition, while those of 300 g/10 min or greater deteriorate the tensile elongation at break. Those outside the above-described range are therefore not preferred.

In the present invention, although the hydrogenated block copolymer can take any form such as linear, branched, radial or comb-like form, it should comprise at least two polymer blocks mainly comprising an aromatic vinyl hydrocarbon compound monomer unit and at least two hydrogenated polymer blocks B mainly comprising a butadiene monomer unit. In addition, the hydrogenated block copolymer of the present invention must have, as at least one terminal block, the polymer block B. Preferred structures include A-B-A-B, B-A-B-A-B and (B-A-B)$_n$-X (wherein n stands for an integer of 2 or greater and X represents the residue of a coupling agent). When a random copolymer is formed at the boundary of each block, the random copolymer may have a tapered structure in which its composition gradually changes.

In the hydrogenated block copolymer of the present invention, the polymer block A mainly comprising an aromatic vinyl hydrocarbon compound monomer unit preferably has a molecular weight of at least 13,000 but not greater than 60,000, with a range of at least 15,000 but not greater than 55,000 being more preferred and a range of at least 17,000 but not greater than 51,000 being particularly preferred. Molecular weights less than 13,000 deteriorate the balance between the appearance of the molded article and tensile elongation at break, while those exceeding 60,000 deteriorate the moldability. It is preferred that at least one of the hydrogenated polymer blocks, between two polymer blocks A, mainly comprising a butadiene monomer unit has a molecular weight of at least 30,000 but not greater than 80,000, with a range of at least 35,000 but not greater than 70,000 being preferred and a range of at least 40,000 but not greater than 64,000 being particularly preferred. Molecular weights less than 30,000 deteriorate the balance between the appearance of the molded article and tensile elongation at break, while those exceeding 80,000 deteriorate the moldability.

The proportion of each of the terminal polymer block(s) B in the hydrogenated block copolymer is at least 0.1 wt % but less than 9.1 wt %. From the viewpoints of appearance of the molded article and tensile elongation at break, proportions of at least 0.3 wt % but not greater than 7.5 wt % are preferred, with ratios exceeding 0.5 wt % but less than 5.0 wt % being more preferred. Proportions less than 0.1 wt % deteriorate the balance among appearance of the molded article, moldability, and heat resistance, while those of 9.1 wt % or greater deteriorate the balance among appearance of the molded article, moldability, and tensile elongation at break. When the hydrogenated block copolymer is in the form of A-B-A-B, for example, the proportion of the terminal polymer block B is at least 0.1 wt % but less than 9.1 wt %. When the hydrogenated block copolymer is in the form of B1-A-B2-A-B3 (B1, B2 and B3: hydrogenated polymer blocks each mainly comprising a butadiene monomer unit), for example, the proportion of the terminal polymer block B1 must falls within a range of at least 0.1 wt % but less than 9.1 wt % and that of the polymer block B3 at the other terminal must also fall within a range of at least 0.1 wt % but less than 9.1 wt %.

The present inventors have found that the hydrogenated block copolymer of the present invention has excellent fluidity, which means excellent moldability, owing to the effects of a specific amount of the terminal polymer block B. For the improvement of the mechanical properties such as tensile elongation at break and heat resistance, an increase in the molecular weight of the whole composition is considered as one measure. In this case, however, fluidity is lowered, leading to a deterioration in moldability. The hydrogenated block copolymer according to the present invention is an epoch-making invention which does not cause a deterioration in the moldability, while improving the mechanical properties.

The hydrogenated block copolymer of the present invention preferably has a domain degradation temperature (Tdd) of 150° C. or higher, with 160° C. or higher being more preferred and 170° C. or higher being particularly preferred.

Temperatures less than 150° C. are not preferred, because they deteriorate the heat resistance of the composition. The hydrogenated block copolymer of the present invention comprises polymer blocks A mainly comprising an aromatic vinyl hydrocarbon compound unit and hydrogenated polymer blocks B mainly comprising a butadiene monomer unit. At temperatures not greater than the glass transition point of the polymer block A, the blocks each forms a domain and are under the state of micro phase separation. The domain of the polymer block A has a glass transition temperature (Tg) at which melting starts and on the higher temperature side, there exists a domain degradation temperature (Tdd) which permits the polymer chain of the polymer block A, which has been melted and released from the restraint, to start moving from the domain. At Tg or Tdd, the hydrogenated block copolymer softens. In general, it is regarded that the higher the thermally softening temperature, the better heat resistance. For example, when the polymer block A is polystyrene, it has a Tg of about 100° C. This Tg does not undergo a change, influenced by the molecular weight when the polymer block A has a molecular weight of about 13,000 or greater. The Tg is also free from the influence of the block structure. Tdd, however, increases with a rise in the molecular weight. Finding this fact, the present inventors have carried out an investigation based on the presumption that a composition which is required to have heat resistance is improved largely in this property by raising Tdd. As a result, to their surprise, it has been found that supposing that the molecular weight of the polymer block A is the same, Tdd shows a drastic increase by the addition of a hydrogenated polymer block to the terminal of the hydrogenated block copolymer, which is a requirement of the hydrogenated block copolymer of the present invention, and that a composition added with the hydrogenated polymer block B has largely improved heat resistance. In general, the fluidity (a measure for moldability) and softening temperature of the hydrogenated block copolymer are not satisfied simultaneously. For example, by lowering in the molecular weight for fluidity improvement, the softening temperature inevitably decreases. The hydrogenated block copolymer having, at the terminal thereof, a specific amount of the polymer block B is, as described above, an epoch-making invention which permits simultaneous improvement of two contradictory properties.

The hydrogenated block copolymer falling within the scope of the present invention can be prepared by the process described, for example, in JP-B-36-19286, JP-B-43-14979 or JP-B-49-36957. According to the above-described process, an aromatic vinyl monomer and a butadiene monomer are block copolymerized in a hydrocarbon solvent by using an organic lithium compound as an anionic polymerization initiator and, as a vinylating agent, an ether compound such as diethyl ether, tetrahydrofuran, a tertiary amine such as triethylamine or N,N,N',N'-tetramethylethylenediamine and if necessary, a polyfunctional compound such as epoxylated soybean oil, silicon tetrachloride, dimethyldichlorosilane, ethyl benzoate or phenyl benzoate as a coupling agent. By the above-described process, a block copolymer having a linear, branched or radial structure can be obtained.

The hydrogenated block copolymer of the present invention can be obtained by the hydrogenation of the above-described block copolymer by a known process, for example, the process described in JP-B-42-87045. The hydrogenated block copolymer usable in the present invention may partially or wholly contain that modified by the addition reaction with an unsaturated carboxylic acid or derivative thereof to have a functional group. It can be used in combination with a hydrogenated block copolymer having a different composition, or an olefin base elastomer such as ethylene propylene rubber.

The resin composition of the present invention can be adjusted according to the ratio of each component by an apparatus ordinarily employed for the mixing of a high-molecular substance. Examples of such a kneader include Banbury mixer, Labo Plasto Mill, single-screw extruder and twin-screw extruder. Mixing under a molten state by an extruder is preferred from the viewpoints of the productivity and good kneading properties.

The resin composition 1 of the present invention comprises (1) 20 to 80 parts by weight of a polypropylene resin, (2a) 20 to 80 parts by weight of a polyphenylene ether resin, and (3) 1 to 40.parts by weight of a hydrogenated block copolymer. When the amount of the polypropylene resin is less than 20 parts by weight, the resulting resin composition has deteriorated organic solvent resistance. When the amount exceeds 80 parts by weight, on the other hand, the resulting resin composition has deteriorated heat resistance. At amounts of the polyphenylene ether resin less than 20 parts by weight, the resulting resin composition has deteriorated rigidity and heat resistance, while at amounts exceeding 80 parts by weight, the resulting resin composition has deteriorated organic solvent resistance. Amounts of the hydrogenated block copolymer less than 1 part by weight deteriorate the impact resistance of the resin composition, while those exceeding 40 parts by weight deteriorate its rigidity.

The resin composition 2 of the present invention comprises (1) 20 to 80 parts by weight of a polypropylene resin, (2b) 20 to 80 parts by weight of a polystyrene resin, and (3) 1 to 40 parts by weight of a hydrogenated block copolymer. When the amount of the polypropylene resin is less than 20 parts by weight, the resulting resin composition has deteriorated organic solvent resistance. When the amount exceeds 80 parts by weight, on the other hand, the resulting resin composition has deteriorated heat resistance. At amounts of the polystyrene resin less than 20 parts by weight, the resulting resin composition has deteriorated rigidity, while at amounts exceeding 80 parts by weight, the resulting resin composition has deteriorated organic solvent resistance. Amounts of the hydrogenated block copolymer less than 1 part by weight deteriorate the impact resistance of the resin composition, while those exceeding 95 parts by weight deteriorate its rigidity.

To the composition of the present invention, an inorganic filler, stabilizer, lubricant, colorant, silicone oil, flame retardant and/or the like can be added. Examples of the inorganic filler include calcium carbonate, talc, magnesium hydroxide, mica, barium sulfate, silicic acid (white carbon), titanium oxide and carbon black. Those of the stabilizer include hindered phenol antioxidants, phosphorus base heat stabilizers, hindered amine base light stabilizers and benzotriazole base UV absorbers. Examples of the lubricant include stearic acid, stearates and metal salts of stearic acid.

The present invention will hereinafter be described in detail. It should however be borne in mind that the present invention is not limited by these examples.

EXAMPLES (I) Each Component
(1) Polypropylene resin

A propylene homopolymer "SSA510B" (MFR 0.5 g/10 min) produced by Nippon Polyolefin Co., Ltd. was employed.

(2a) Polyphenylene ether resin

As a polyphenylene ether resin, poly(2,6-dimethyl-1,4-phenylene)ether having a reduced viscosity of 0.42 dl/g in a chloroform solution at 30° C. was employed.

(2b) Polystyrene resin

As a polystyrene resin, "Styron 685" (polystyrene) and "Styron H8117" (high impact polystyrene), each produced by Asahi Chemical Industry Co., Ltd. were employed.

(3) Hydrogenated block copolymer

A styrene-butadiene block copolymer was obtained by anionic block copolymerization of styrene and butadiene in a solvent of cyclohexane by using n-butyl lithium as an initiator and tetrahydrofuran as a 1,2-bond amount regulator. As a coupling polymer, dimethyldichlorosilane was used.

Then, the resulting styrene-butadiene block copolymer was hydrogenated under a hydrogen pressure of 5 Kg/cm$^2$ and a temperature of 50° C. by using bis($\eta^5$-cyclopentadienyl) titanium dichloride and n-butyl lithium as a hydrogenation catalyst. The structure, molecular weight, 1,2-bond amount and hydrogenation ratio of the polymer were controlled by changing the amount or order of the monomer charged, the amount of the catalyst, the amount of the 1,2-bond amount regulator and polymerization temperature, and hydrogenation time, respectively. The styrene content was measured by an ultraviolet spectrophotometer (UV), while the 1,2-bond amount and hydrogenation ratio were measured using a nuclear magnetic resonance (NMR) apparatus. Regarded as a domain degradation temperature (Tdd) is the first peak temperature available by the measurement of tan δ under the conditions of a parallel plate, frequency of 6.28 rad/sec and cooling temperature of 3° C./min from 250° C. by using a mechanical spectrometer "RMS800" manufactured by Rheometrics Inc.

The structure and analysis data of each sample are shown in Table 1. Measurement results of Tdd of SEBS1 and SEBS3 are shown in FIG. 1.

TABLE 1

| | Structure Molecular weight of each block | Amount of one terminal polymer block B1 (wt %) | Hydrogenation ratio (%) | Amount of styrene (wt %) | MFR (g/10 min) | 1,2-bond amount (mol %) | Tdd (° C.) |
|---|---|---|---|---|---|---|---|
| SEBS 1 | B1-A-B2-A 4700-23000-45000-23000 | 4.9 | 99.8 | 48.1 | 2.8 | 74.1 | 180 |
| SEBS 2 | B1-A-B2-A 7000-34000-66000-34000 | 5.0 | 99.7 | 48.2 | 0.04 | 75.6 | 222 |
| SEBS 3 | A-B2-A 23000-50000-23000 | 0.0 | 99.8 | 47.9 | 0.8 | 71.1 | 148 |
| SEBS 4 | A-B2-A 34000-Y3000-34000 | 0.0 | 99.8 | 48.2 | No flow | 71.4 | 168 |
| SEBS 5 | B1-A-B2-A 12700-23000-47000-23000 | 12.0 | 99.8 | 45.4 | 2.0 | 71.3 | 177 |
| SEBS 6 | B1-A-B2-A 4400-21000-41000-21000 | 5.0 | 99.7 | 48.1 | 0.5 | 36.1 | 158 |

(II) Adjustment of Resin Compositions and Measurement of Their Physical Properties The component (1), the component (2a) or (2b), and the component (3) were dry blended at a ratio as shown in Table 2. The resulting mixture was kneaded under a molten state by a twin-screw extruder set at 270° C. (210° C. in the case of the component 2b), by which pellets were obtained. The resulting pellets were charged in an injection molder set at 280° C. (210° C. in the case of the component 2b), followed by molding, by which a test piece for measurement was prepared. The measurement results of physical properties are shown in Table 2.

Although the composition using SEBS4, which is shown in Table 1, was kneaded under a molten state and then injection molded, an unmolten substance was observed from each of the molded articles obtained using the component (2a) and the component (2b). It was therefore impossible to evaluate its physical properties.

The physical properties were measured as described below:

MFR (a measure for moldability): The melt flow rate was measured under the conditions of 230° C. and a load of 5 Kg.

Flexural modulus (a measure for rigidity): measured in accordance with ASTM D790.

Thermal deformation temperature (a measure for heat resistance): measured in accordance with ASTM D648 (load of 18.5 kgf/cm$^2$)

Vicat softening point (a measure for heat resistance): measured in accordance with ASTM D1525.

Izod impact strength (a measure for impact strength): in accordance with ASTM D256.

Tensile elongation at break: in accordance with ASTM D648.

Appearance of molded article: A flat plate of 8.9 cm wide, 14.9 cm long and 2 mm thick was prepared by injection molding and the generation of flow marks was visually observed. The plate on which no flow mark was observed or some flow marks appeared but they provide no hindrance to the practical use was evaluated as ◯, while the plate on which many flow marks appeared so as to cause a hindrance to the practical use was evaluated as X.

From Table 2, it is apparent that the resin compositions of the present invention are excellent.

TABLE 2

| | | Ex. 1 | Ex. 2 | Comp. Ex. 1 | Comp. Ex. 2 | Comp. Ex. 3 |
|---|---|---|---|---|---|---|
| Composition | (1) Polypropylene resin | 60 parts by weight | 60 parts by weight | 60 parts by weight | 60 parts by weight | 60 parts by weight |
| | (2a) Polyphenylene ether resin | 40 parts by weight | 40 parts by weight | 40 parts by weight | 40 parts by weight | 40 parts by weight |
| | (2b) Polystyrene resin H8117 | | | | | |
| | 685 | | | | | |
| | (3) Hydrogenated block copolymer | SEBS1 10 parts by weight | SEBS2 10 parts by weight | SEBS3 10 parts by weight | SEBS5 10 parts by weight | SEBS6 10 parts by weight |
| Physical properties | Izod impact strength 23° C. (J/m) | 420 | 480 | 320 | 350 | 320 |
| | Flexural modulus (MPa) | 1600 | 1650 | 1590 | 1500 | 1600 |
| | Thermal deformation temp. (° C.) | 108 | 111 | 104 | 107 | 105 |
| | Vicat softening point (° C.) | — | — | — | — | — |
| | Tensile elongation at break (%) | 130 | 180 | 100 | 80 | 10 |
| | Appearance of molded article | ◯ | ◯ | X | X | X |

| | | Ex. 3 | Ex. 4 | Comp. Ex. 4 | Comp. Ex. 5 | Comp. Ex. 6 |
|---|---|---|---|---|---|---|
| Composition | (1) Polypropylene resin | 30 parts by weight | 30 parts by weight | 30 parts by weight | 30 parts by weight | 30 parts by weight |
| | (2a) Polyphenylene ether resin | | | | | |
| | (2b) Polystyrene resin H8117 | 35 parts by weight | 35 parts by weight | 35 parts by weight | 35 parts by weight | 35 parts by weight |
| | 685 | 35 parts by weight | 35 parts by weight | 35 parts by weight | 35 parts by weight | 35 parts by weight |
| | (3) Hydrogenated block copolymer | SEBS1 10 parts by weight | SEBS2 10 parts by weight | SEBS3 10 parts by weight | SEBS5 10 parts by weight | SEBS6 10 parts by weight |
| Physical properties | Izod impact strength 23° C. (J/m) | 270 | 270 | 220 | 220 | 200 |
| | Flexural modulus (MPa) | 1900 | 1920 | 1900 | 1800 | 1900 |
| | Thermal deformation temp. (° C.) | — | — | — | — | — |
| | Vicat softening point (° C.) | 108 | 109 | 105 | 108 | 106 |
| | Tensile elongation at break (%) | 80 | 80 | 70 | 30 | 10 |
| | Appearance of molded article | ◯ | ◯ | X | X | X |

Industrial Applicability

The resin compositions according to the present invention are excellent in rigidity, heat resistance and organic solvent resistance and at the same time, excellent in the balance among the appearance of their molded article, tensile elongation at break and moldability, so that they are useful in the electronic and electric fields, automobile fields and industrial material fields including battery container materials, food heat-resistant container materials and inner wall materials of a refrigerator.

What is claimed is:

1. A hydrogenated block copolymer which comprises at least two polymer blocks A each mainly comprising an aromatic vinyl hydrocarbon compound monomer unit and at least two hydrogenated polymer blocks B each mainly comprising a hydrogenated butadiene monomer unit, at least 90% of olefinically unsaturated double bonds in the polymer blocks mainly comprising a butadiene monomer unit before hydrogenation having been hydrogenated, wherein at least one of the blocks at the terminal of the hydrogenated block copolymer is the polymer block B, wherein the proportion of the terminal polymer blocks B in the hydrogenated block copolymer is at least 0.1 wt % but less than 9.1 wt %, wherein the proportion of the aromatic vinyl hydrocarbon compound in the hydrogenated block copolymer is at least 25 wt % but less than 80 wt %, wherein the 1,2-bond content of the polymer blocks mainly comprising a butadiene monomer unit before hydrogenation is, on average, at least 60 mol % but less than 99 mol %, and wherein said hydrogenated block copolymer has a domain degradation temperature (Tdd) of 150° C. or higher.

2. The hydrogenated block copolymer according to claim 1, wherein the proportion of the aromatic vinyl hydrocarbon compound in the hydrogenated block copolymer is at least 25 wt % but less than 70 wt %.

3. The hydrogenated block copolymer according to claim 1, wherein the proportion of the terminal polymer blocks B in the hydrogenated block copolymer exceeds 0.5 wt % but less than 5.0 wt %.

4. A resin composition comprising the following components (1), (2a) and (3):

(1) 20 to 80 parts by weight of a polypropylene resin, (2a) 20 to 80 parts by weight of a polyphenylene ether resin, and (3) 1 to 40 parts by weight of the hydrogenated block copolymer as claimed in claim 1, wherein said component (3) has a domain degradation temperature (Tdd) of 150° C. or higher.

5. The resin composition according to claim 4, wherein, in the component (3), the proportion of the aromatic vinyl hydrocarbon compound in the hydrogenated block copolymer is at least 25 wt % but less than 70 wt %.

6. The resin composition according to claim 4, wherein, in the component (3), the proportion of the terminal polymer block B in the hydrogenated block copolymer exceeds 0.5 wt % but less than 5.0 wt %.

7. The resin composition according to claim 4, wherein said polyphenylene ether resin is selected from the group consisting of poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dibutyl-1,4-phenylene) ether, poly(2,6-dipropenyl-4,4-phenylene) ether, poly(2,6-dilauryl-1,4-phenylene) ether, poly(2,6-diphenyl-1,4-phenylene) ether, poly(2,6-dimethoxy-1,4-phenylene) ether, poly(2,6-diethoxy-1,4-phenylene) ether, poly(2-methoxy-6-ethoxy-1,4-phenylene) ether, poly(2-ethyl-6-stearyloxy-1,4-phenylene) ether, poly(2,6-dichloro-1,4-phenylene) ether, poly(2-methyl-6-phenyl-1,4-phenylene) ether, poly(2,6-dibenzyl-1,4-phenylene) ether, poly(2-ethoxy-1,4-phenylene) ether, poly(2-chloro-1,4-phenylene) ether and poly(2,5-dibromo-1,4-phenylene) ether.

8. The resin composition according to claim 4, wherein said component (3) has a domain degradation temperature (Tdd) of 160° C. or higher.

9. A resin composition comprising the following components (1), (2b) and (3):

(1) 20 to 80 parts by weight of a polypropylene resin, (2b) 20 to 80 parts by weight of a polystyrene resin, and (3) 1 to 40 parts by weight of the hydrogenated block copolymer as claimed in claim 1, wherein said component (3) has a domain degradation temperature (Tdd) of 150° C. or higher.

10. The resin composition according to claim 9, wherein, in the component (3), the proportion of the aromatic vinyl hydrocarbon compound in the hydrogenated block copolymer is at least 25 wt % but less than 70 wt %.

11. The resin composition according to claim 9, wherein, in the component (3), the proportion of the terminal polymer block B in the hydrogenated block copolymer exceeds 0.5 wt % but less than 5.0 wt %.

12. The resin composition according to claim 9, wherein said component (3) has a domain degradation temperature (Tdd) of 160° C. or higher.

13. The hydrogenated block copolymer according to claim 1, wherein said aromatic vinyl hydrocarbon compound monomer unit is selected from the group consisting of styrene, alkyl styrene, paramethoxy styrene and vinyl naphthalene.

14. The hydrogenated block copolymer according to claim 1, wherein said wherein the 1,2-bond content of the polymer blocks mainly comprising a butadiene monomer unit before hydrogenation is, on average, at least 70 mol % but less than 99 mol %.

15. The hydrogenated block copolymer according to claim 1, wherein the structures of said blocks A and B is: A-B-A-B, B-A-B-A-B or (B-A-B)$_n$-X, wherein n is an integer of 2 or greater and X is the residue of a coupling agent.

16. The hydrogenated block copolymer according to claim 1, wherein said hydrogenated block copolymer has a domain degradation temperature (Tdd) of 160° C. or higher.

* * * * *